UNITED STATES PATENT OFFICE.

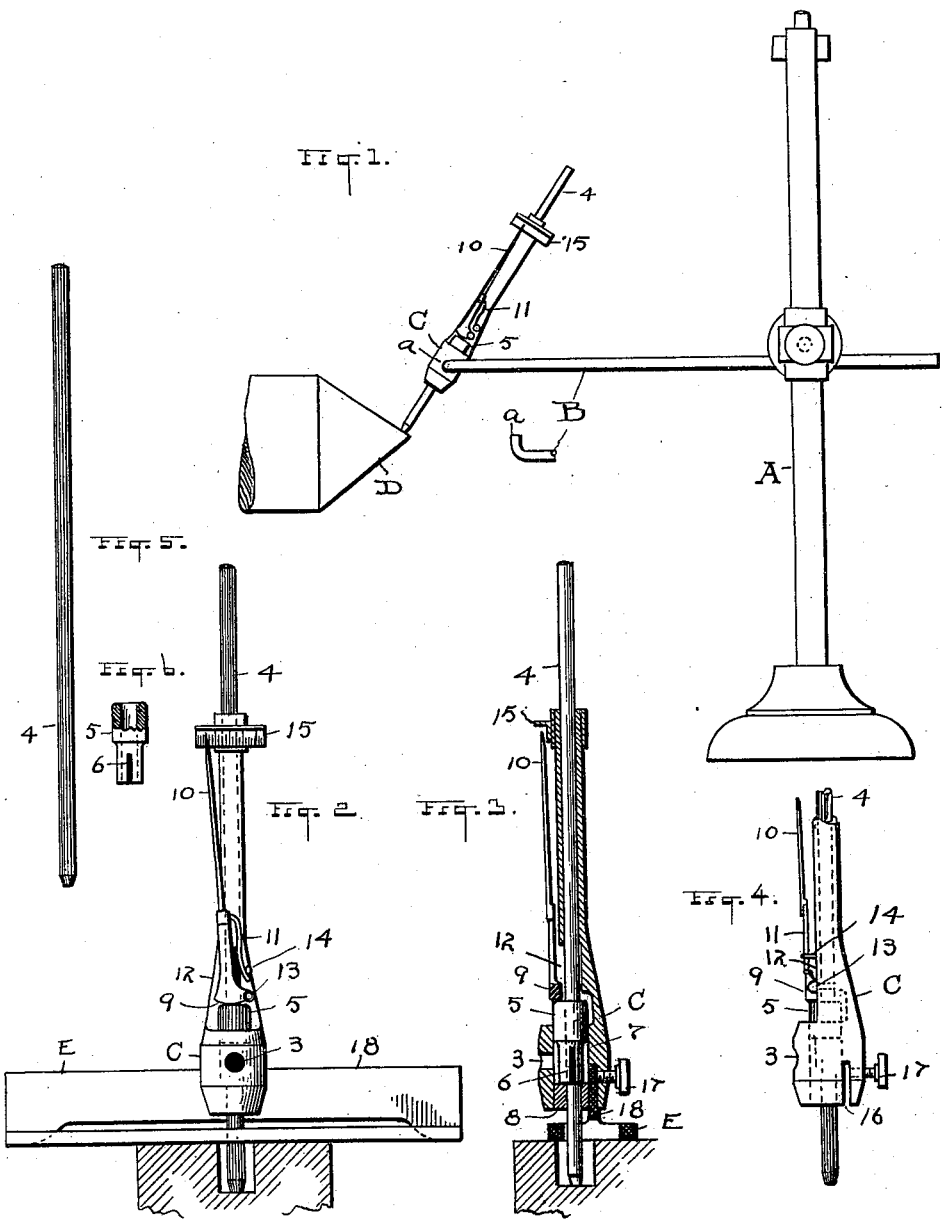

CHARLES E. HAUER, OF CLEVELAND, OHIO.

UNIVERSAL INDICATOR.

SPECIFICATION forming part of Letters Patent No. 598,927, dated February 15, 1898.

Application filed January 30, 1897. Serial No. 621,294. (No model.)

*To all whom it may concern:*

Be it known that I, CHARLES E. HAUER, a citizen of the United States, residing at Cleveland, in the county of Cuyahoga and State of Ohio, have invented certain new and useful Improvements in Universal Indicators; and I do hereby declare that the following is a full, clear, and exact description of the invention, which will enable others skilled in the art to which it appertains to make and use the same.

My invention relates to universal indicators for testing depths and surfaces; and the invention consists in the construction and arrangement of parts, substantially as shown, and more particularly pointed out in the claims.

The object of the invention is to provide machinists and other like workers with an instrument of precision for measuring and testing surfaces and depths and which can be attached to the surface-gages generally in use or attached to a scale and used as a depth-gage or be otherwise used, as convenience may suggest.

In the accompanying drawings, Figure 1 represents my improved indicator attached to an ordinary surface-gage of common form and illustrates the utility of the device in testing lathe-centers. Fig. 2 is a front elevation of the indicator attached to a base which forms a depth-gage, showing the method of testing the depth of a hole, cavity, socket, or the like. Fig. 3 is a vertical sectional elevation of Fig. 2, and Fig. 4 is a side elevation of the indicator alone and partly broken off at its top. Fig. 5 is a detail view of the central rod alone; and Fig. 6, a detail of the friction-collar, partly in section.

In Fig. 1, A represents a common form of surface-gage standard or support, having the rod D mounted thereon and adjustable in different directions. The end of this rod is bent at right angles, as seen at *a* in the fragmentary view in Fig. 1, and the body C of the indicator has at its lower end a hole 3 drilled therein, into which the end of rod B fits so snugly that the indicator will remain in any position or angle that it may be desired to adjust it to. As shown in Fig. 1, the indicator is testing a lathe-center D. The indicator proper consists of a substantially tubular body or shell C, through the center of which a rod 4 passes and is free to slide up and down therein, but is held in given or adjusted place by a friction-collar 5, which is slotted at 6. This collar is located in a chamber 7 in the shell C and has a limited up-and-down movement therein, but is normally held down on the bottom part or plug 8 by the base 9 of the indicator-needle 10 and its spring 11, the said base 9 bearing against the top edge of the collar 5, which projects beyond the plane of the open side 12 of the body or shell C. The indicator-needle is pivoted to the body C at 13, and the spring is fastened at or about the middle of the indicator-needle and bears against a pin 14 on the said body. The tension of this spring normally keeps the point of the needle to the left and also bears down on the collar 5.

At the top of the body C a scale 15 is located, which provides means for more clearly seeing the deflections of the needle, and on some work the rod 4 and collar 5 are so set as to have the point of the needle in the center of this scale, or at a neutral point, so that any irregularities of the surface that is being tested can be instantly seen and determined.

When the instrument is used as a depth-gage, a base E, substantially as shown in Figs. 2 and 3, is employed, and the slot 16 and set-screw 17 at the bottom of the body C are utilized to fasten the same to the straight vertical post or portion 18 of the base E. If desired, the same slot 16 and screw 17 or their equivalent can be used to fasten the indicator to a scale or other blade-like instrument.

The rod 4 can be adjusted to any length by merely moving it by hand in the split collar 5, the friction of said collar holding the rod in any position to which it may be set. The advantage of having a friction-collar and a separate removable rod is that a quick adjustment can be obtained and that a longer or shorter rod can be easily and immediately substituted, as is very often desired where different degrees of depth are met with—as, for example, in measuring holes of more or less depth.

A most important feature of this invention consists in the construction of the indicator-needle, its spring, and the split collar. With this construction, as described, the indicator-needle is always positive in its action, and no matter how much wear there may be on the spring or collar the base of the needle is always down on the collar.

The bottom of the body C has a plug driven or threaded into it, as shown, and if the top of the collar or the base of the spring should become much worn, so as to deflect the needle too far to the left of the scale 15, the mere moving of the plug inward or upward just a trifle will adjust the needle-point to the scale 15 at the right point.

What I claim as new, and desire to secure by Letters Patent, is—

1. In an indicator for testing surfaces and depths, a body having a chamber, a collar in said chamber constructed to have a free limited movement axially therein, a rod frictionally engaged by said collar and operating therewith, an indicating-needle pivoted on the body and constructed to be operated by the rod and collar, a spring constructed to bear the base of said needle on said collar, and a plug in the bottom of said chamber bearing against said collar to adjust said needle, substantially as described.

2. An indicator for testing surfaces and depths comprising a body C, a removable rod 4 and frictional collar 5 free to move in said body, an indicating-needle 10 and spring 11 pivoted on said body, a scale 15 for said needle, an adjustable plug in said body bearing against said collar, and means to attach the body to a support, substantially as described.

Witness my hand to the foregoing specification this 7th day of January, 1897.

CHARLES E. HAUER.

Witnesses:
H. T. FISHER,
R. B. MOSER.